United States Patent [19]

Amano

[11] Patent Number: 4,624,534
[45] Date of Patent: Nov. 25, 1986

[54] ACOUSTOOPTIC DEFLECTION DEVICE CAPABLE OF REDUCING A REFLECTION LOSS OVER A WIDE FREQUENCY BAND

[75] Inventor: Satoru Amano, Yamanashi, Japan

[73] Assignee: Hoya Corporation, Tokyo, Japan

[21] Appl. No.: 626,790

[22] Filed: Jul. 2, 1984

[30] Foreign Application Priority Data

Jun. 30, 1983 [JP] Japan ................... 58-118529

[51] Int. Cl.⁴ ............................. G02F 1/33
[52] U.S. Cl. ................................. 350/358
[58] Field of Search ............ 350/358, 371, 162.17, 350/162.2, 6.8, 162.23, 168, 162.21, 162.22, 433

[56] References Cited

U.S. PATENT DOCUMENTS 3,964,824 6/1976 Dixon ..................... 350/433
4,201,455 5/1980 Vadasz et al. ............ 350/358
4,516,838 5/1985 Badenian ................. 350/358

FOREIGN PATENT DOCUMENTS 1522555 8/1978 United Kingdom .

OTHER PUBLICATIONS

Murray, "Multiple Beam Generator", Western Electric Tech. Digest, No. 15, p. 33, Jul. 1969.

Primary Examiner—William H. Punter
Attorney, Agent, or Firm—Roberts, Spiecens & Cohen

[57] ABSTRACT

In an acoustooptic deflection device, a plurality of split light beams are produced from a beam splitter in response to a single incident light beam and projected onto partial deflectors comprising acoustooptic medium blocks and transducers attached to the blocks, respectively. The transducers are supplied from voltage controlled oscillators with carrier signals falling within frequency bands different from one another, respectively, and have different thicknesses to vary input impedances of the respective partial deflectors. Preferably, deflected light beams are propagated from the partial deflectors through an optical system to be converged into a predetermined geometric arrangement. The beam splitter may be a body having a pair of parallel surfaces covered with reflection and semitransparent layers, a diffraction grating, or a fiber grating.

11 Claims, 15 Drawing Figures

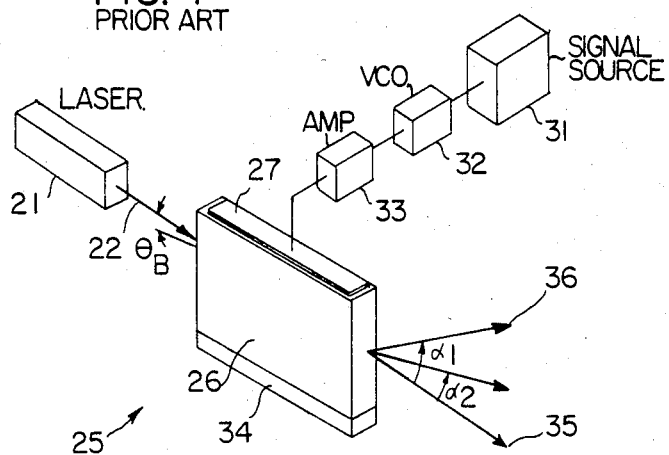
FIG. 1
PRIOR ART
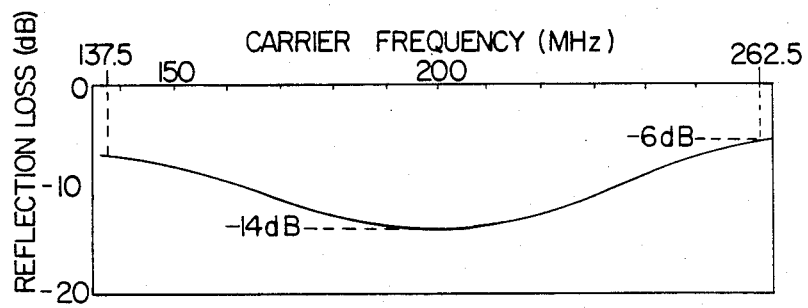
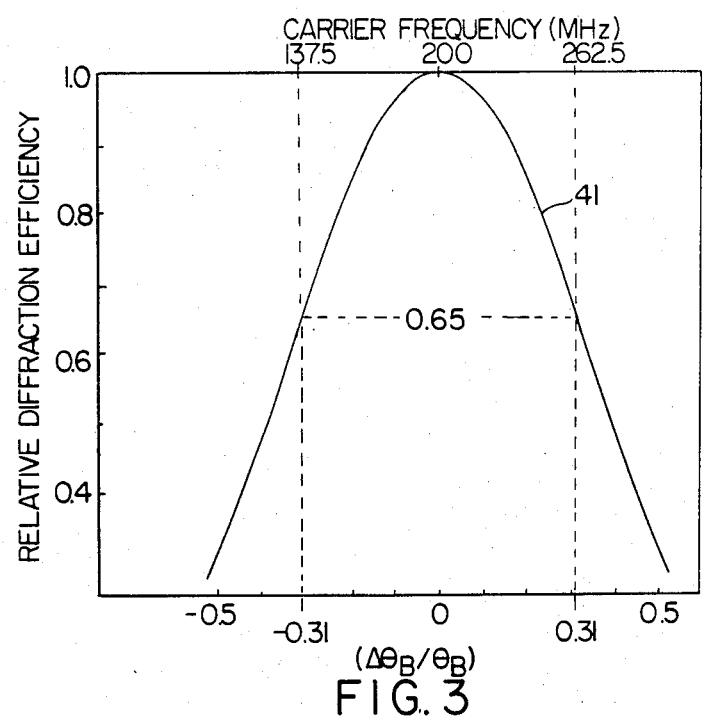
FIG. 3

FIG.8(a)
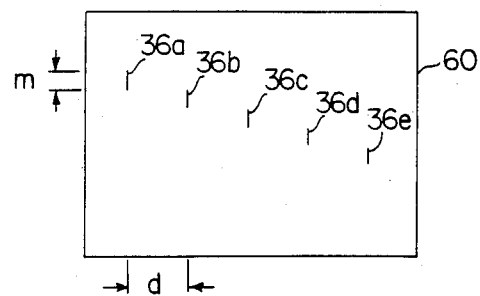
FIG.8(b)
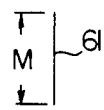
FIG.9(a)
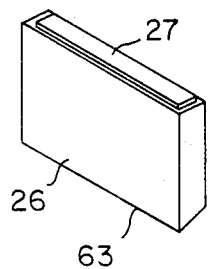
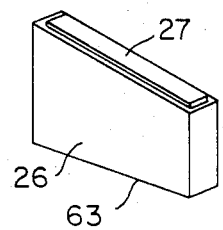
FIG.9(b)
FIG.11
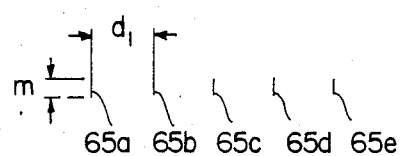

ACOUSTOOPTIC DEFLECTION DEVICE CAPABLE OF REDUCING A REFLECTION LOSS OVER A WIDE FREQUENCY BAND

BACKGROUND OF THE INVENTION

This invention relates to an acoustooptic deflection device for use in deflecting a light beam by the use of an acoustic wave.

A conventional acoustooptic deflection device of the type described deflects a light beam by making use of Raman-Nath or Brillouin scattering, as well known in the art. For this purpose, the acoustooptic deflection device comprises an acoustooptic medium supplied with the light beam and a transducer attached to the acoustooptic medium. Responsive to an electric signal, the transducer generates an acoustic or ultrasonic wave directed to the acoustooptic medium. The acoustic wave interacts with the light beam in the acoustooptic medium so as to deflect the light beam by a deflection angle and to produce a deflected light beam. Such a deflection angle is variable in dependence on the frequency of the electric signal.

It is preferable that the deflection angle is as large as possible to raise a resolution of the deflected light beam and that luminous energy of the deflected light beam is invariable.

In order to expand the deflection angle, the frequency of the electric signal should be varied over a wide frequency band. However, it is impossible to match an input impedance of the transducer to a predetermined value of, for example, 50 ohms in such a wide frequency band. Accordingly, a reflection loss inescapably becomes large and deflection efficiency, namely, the luminous energy of the deflected light beam is objectionably reduced in the conventional acoustooptic deflection device.

In the copending U.S. patent application Ser. No. 517,346 filed on July 26, 1983, by S. Amano et al, now U.S. Pat. No. 4,592,621, an acoustooptic modulation device is proposed which comprises a single acoustooptic medium for individually deflecting a plurality of light beams by acoustic waves produced from a plurality of transducers, respectively. The transducers are activated by carrier waves each of which has a single carrier frequency and which are individually subjected to modulation. Consideration may be made about applying such an acoustooptic modulation device to the acoustooptic deflection device as mentioned above. However, such application brings about an increase of reflection losses because the frequency of the electric signal should widely be varied in the acoustooptic deflection device.

SUMMARY OF THE INVENTION

It is an object of this invention to provide an acoustooptic deflection device, wherein a reflection loss can be reduced over a wide frequency range.

It is another object of this invention to provide an acoustooptic deflection device of the type described, wherein luminous energy of each deflected beam is kept substantially invariable.

It is a further object of this invention to provide an acoustooptic deflection device of the type described, wherein the deflected beams can be converged into a predetermined configuration.

According to this invention, an acoustooptic deflection device is responsive to a single light incident beam and produces a predetermined number of outgoing light beams resulting from the incident light beam. The device comprises beam splitting means for splitting the incident light beam into split light beams equal in number to the predetermined number, signal producing means for producing the predetermined number of carrier signals which have frequencies falling within frequency bands different from one another, and deflecting means equal in number to the predetermined number for individually and acoustooptically deflecting the split light beams in response to the carrier signals to produce deflected light beams as the outgoing light beams, respectively.

BRIEF DESCRIPTION OF THE DRAWING

FIG. 1 schematically shows a perspective view of a conventional deflection device;

FIG. 2 shows a graphical representation for use in describing a characteristic of the conventional deflection device;

FIG. 3 shows another graphical representation for use in describing another characteristic of the conventional deflection device;

FIGS. 8(a) and 8(b) show elevational views for use in describing operation of a lens system illustrated in FIG. 4;

FIGS. 9(a) and 9(b) show perspective views of partial deflectors applicable to the acoustooptic deflection device illustrated in FIG. 4;

FIG. 11 shows a view for use in describing the operation of the acoustooptic deflection device illustrated in FIG. 10;

DESCRIPTION OF THE PREFERRED EMBODIMENT

Figure 4:
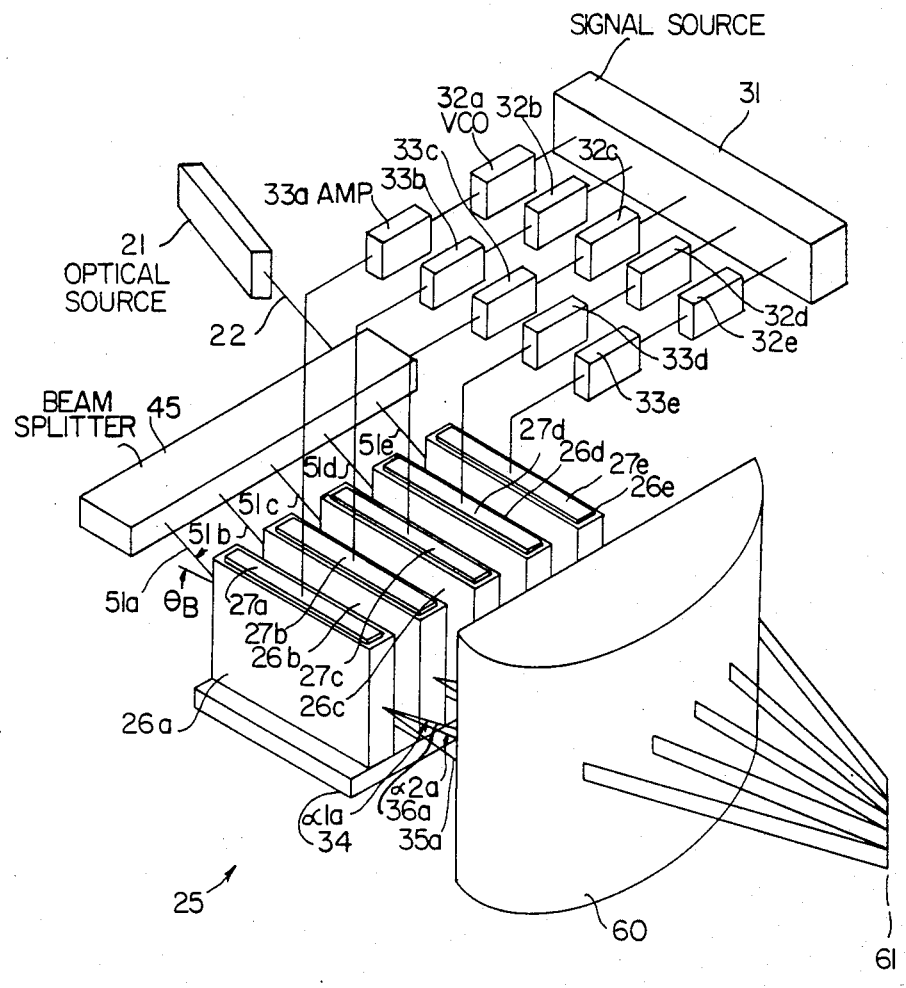
FIG. 4 shows a schematic perspective view of an acoustooptic deflection device according to a first embodiment of this invention.

Referring to FIG. 1, a conventional acoustooptic deflection device will be described for a better understanding of this invention. The acoustooptic deflection device comprises an optical source 21 for generating a laser beam 22 and an acoustooptic deflector 25 supplied with the laser beam 22 as an incident light beam. The acoustooptic deflector 25 comprises an acoustooptic medium block 26 of a rectangular parallelepiped shape having an incident surface for receiving the incident light beam 22, an outgoing surface opposite to the incident surface, a pair of side surfaces contiguous to the incident and the outgoing surfaces, and top and bottom surfaces opposite to each other and surrounded by the side surfaces and the incident and the outgoing surfaces. A transducer 27 is attached to the top surface of the acoustooptic medium block 26.

An electric voltage is produced by a signal source 31 and sent to a voltage controlled oscillator 32. The voltage controlled oscillator 32 converts the electric voltage into an electric signal having a frequency determined by the electric voltage. The electric signal may be called a carrier wave and is supplied through a wide band amplifier 33 to the transducer 27. A combination of the signal source 31, the voltage controlled oscillator 32, and the amplifier 33 may be referred to as a signal producing circuit.

Supplied with the carrier wave, the transducer 27 produces an acoustic wave propagated through the acoustooptic medium block 26 towards the bottom surface of the block 26. The acoustic wave is absorbed by an absorber 34 attached to the bottom surface. The illustrated absorber 34 is assumed to be placed in a horizontal plane which will be referred to as a reference plane.

Under the circumstances, when the incident light beam 22 is incident onto the incident surface at a Bragg angle $\theta_B$, a zeroth-order light beam 35 and a first-order diffracted light beam 36 emanate as outgoing light beams from the outgoing surface of the acoustooptic medium block 26. An angle $\alpha_1$ between the zeroth-order light beam 35 and the first-order diffracted light beam 36 is given by:

$$\alpha_1 = \sin^{-1}(\lambda \cdot f_a / v), \qquad (1)$$

where $\lambda$ represents a wavelength of the laser beam 22; $f_a$, the frequency of the carrier wave; and $v$, a sonic velocity of the acoustic wave in the acoustooptic medium block 26.

From Equation (1), it is readily understood that the angle $\alpha_1$ can continuously be varied in dependence upon variation of the carrier frequency $f_a$. In other words, the first-order diffracted light beam 36 can continuously be deflected in response to the variation of the carrier frequency $f_a$. It is assumed that the first-order diffracted light beam 36 can be deflected between $\alpha_1$ and $\alpha_2$ when the carrier frequency $f_a$ is equal to $f_1$ and $f_2$, respectively, where each of $\alpha_1$ and $\alpha_2$ is representative of an angle between the zeroth-order light beam and the first-order diffracted light beam and that a difference between $\alpha_1$ and $\alpha_2$ is called a deflection angle.

In this case, a resolution of the outgoing light beams becomes high with an increase of the deflection angle $(\alpha_1 - \alpha_2)$. The deflection angle can be increased or expanded by varying the carrier frequency $f_a$ over a wide frequency band. However, it is impossible to match an input impedance of the transducer 27 to a predetermined value of, for example, 50 ohms over such a wide frequency band. Accordingly, impedance mismatching inevitably takes place and gives rise to a reflection loss. As a result, interaction of the acoustic wave with the laser beam becomes insufficient in the acoustooptic medium block 26 because of lossy or insufficient conversion between the carrier and the acoustic waves. In addition, luminous energy of the outgoing light beams is reduced on account of the reflection loss.

Temporarily referring to FIG. 2, the carrier frequency $f_a$ is varied in a frequency band between 137.5 MHz and 262.5 MHz, with a center frequency kept at 200 MHz. Under the circumstances, the reflection loss is increased from $-14$ dB to $-6$ dB, as shown in FIG. 2.

Turning back to FIG. 1, the Bragg angle $\theta_B$ of the incident light beam 22 is given outside and inside the acoustooptic medium block 26 by:

$$\left. \begin{array}{l} \theta_B = \alpha_1/2 \\ \text{and } \theta_B = \alpha_1/2N, \text{ respectively,} \end{array} \right\} \qquad (2)$$

where N represents an index of refraction of the acoustooptic medium block 26.

With the illustrated structure, the Bragg angle $\theta_B$ is uniquely determined because the incident light beam 22 and the acoustooptic medium block 26 are spatially fixed to each other. On the other hand, an optimum Bragg angle $\theta_B$ is variable, as readily understood from Equations (1) and (2), when the carrier frequency $f_a$ is varied. Such a variation of the optimum Bragg angle $\theta_B$ brings about a reduction of the luminous energy of the outgoing light beams, namely, a reduction of diffraction efficiency.

Referring to FIG. 3, a curve 41 shows a variation of relative diffraction efficiency measured in the frequency band between 137.5 MHz and 262.5 MHz with the center frequency $f_o$ kept at 200 MHz, like in FIG. 2. As illustrated in FIG. 3, the ordinate represents the relative diffraction efficiency which shows 1.0 at the center frequency $f_o$ of 200 MHz. The abscissa represents a factor which is given by a Bragg angle displacement $\Delta\theta_B$ divided by the Bragg angle $\theta_B$ determined at the center frequency $f_o$. The Bragg angle displacement $\Delta\theta_B$ is also given by a difference between Bragg angles calculated with respect to the center frequency $f_o$ and the carrier frequency $f_a$.

In FIG. 3, the factor $(\Delta\theta_B/\theta_B)$ becomes equal to $-0.31$ and $+31$ when the carrier frequency $f_a$ is equal to 137.5 and 262.5 MHz, respectively. In this case, the relative diffraction efficiency is reduced to 0.65, as shown in FIG. 3, and results in a reduction of the luminous energy.

Referring to FIG. 4, an acoustooptic deflection device according to a first embodiment of this invention comprises similar parts designated by like reference numerals. In FIG. 4, the illustrated signal source 31 comprises a voltage divider (not shown) for dividing a source voltage of, for example, 12 volts into first through fifth output voltages which may be, for example, between 2 and 4 volts, between 4 and 6 volts, between 6 and 8 volts, between 8 and 10 volts, and between 10 and 12 volts, respectively. The first through the fifth output voltages are supplied to first through fifth voltage controlled oscillators 32a to 32e which are operable in first through fifth frequency bands between 137.5 and 162.5 MHz, between 162.5 and 187.5 MHz, between 187.5 and 212.5 MHz, between 212.5 and 237.5 MHz, and between 237.5 and 262.5 MHz, respectively. Each of the first through the fifth frequency bands has a frequency bandwidth of 25 MHz. The first through the fifth frequency bands have first through fifth center frequencies of 150, 175, 200, 225, and 250 MHz respectively.

The first through the fifth voltage controlled oscillators 32a to 32e produce first through fifth carrier waves having frequencies variable within the first through the fifth frequency bands, respectively. Each frequency of the first through the fifth carrier waves is varied in response to each of the first through the fifth output signals supplied from the signal source 31. The first through the fifth carrier waves are delivered to the acoustooptic deflector 25 through first through fifth amplifiers 33a to 33e, respectively.

The illustrated deflector 25 comprises first through fifth partial deflectors attached to the absorber 34 placed along the horizontal plane. As in FIG. 1, the first through the fifth partial deflectors comprise first through fifth acoustooptic medium blocks depicted at 26a, 26b, 26c, 26d, and 26e and first through fifth transducers depicted at 27a, 27b, 27c, 27d, and 27e attached to top surfaces of the medium blocks, respectively. Each of the first through the fifth acoustooptic medium blocks 26a to 26e is of a parallelepiped shape of $10 \times 10 \times 1$ mm and may be, for example, of a single crystal of lead molybdate ($PbMoO_4$) The first through the fifth acoustooptic medium blocks 26a to 26e are arranged on the absorber 34 in parallel to one another with a gap left between two adjacent ones of the medium blocks.

On the other hand, each of the first through the fifth transducers 27a to 27e may be, for example, of a Y plate of 36° made of a single crystal of lithium niobate ($LiNbO_3$). Each transducer is 0.7 mm wide and 5 mm long. Thicknesses of the first through the fifth transducers 27a to 27e are different from one another so that the first through the fifth transducers 27a to 27e are tuned at the first through the fifth center frequencies, respectively. This is because a frequency constant is defined as the product of a resonance frequency of a transducer and the thickness of the transducer, as known in the art, and an optimum thickness can be calculated if the resonance frequency or carrier frequency is determined. For example, the thickness becomes equal to 18.4 micrometers for the carrier frequency of 200 MHz when a single crystal of $LiNbO_3$ is used as the transducer. More specifically, the thicknesses of the first through the fifth transducers 27a to 27e are equal to 24.5, 21.0, 18.4, 16.4, and 14.7 micrometers, respectively, in the example illustrated in FIG. 4.

As in FIG. 1, each of the first through the fifth acoustooptic medium blocks 26a to 26e has incident and outgoing surfaces on the lefthand and the righthand sides of this figure.

A beam splitter 45 is disposed between the optical source 21 and the incident surfaces of the respective acoustooptic medium blocks 26a to 26e. By way of example, the optical source 21 may be a helium-neon laser for generating a laser beam of a wavelength equal to 632.8 nanometers.

Figure 5:
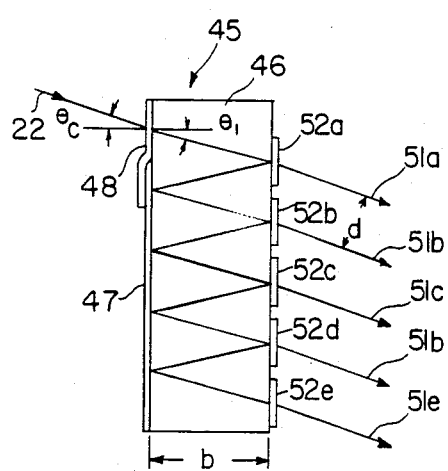
FIG. 5 shows a top view of a beam splitter for use in the acoustooptic deflection device illustrated in FIG. 4.

Referring to FIG. 5 afresh and FIG. 4 again, the beam splitter 45 comprises a body 46 of synthetic quartz glass which is transparent for the incoming light beam 22. The body 46 is of a rectangular parallelepiped shape having first and second principal surfaces which are substantially parallel to each other and which are shown on the lefthand and the righthand sides of FIG. 5, respectively.

The first principal surface has a reflection portion covered with a reflection layer 47 and an incident or entrance portion covered with an antireflection layer 48. The incident light beam 22 is incident onto the incident portion at an angle $\theta_0$ with respect to a line perpendicular to the first principal surface and is propagated towards the second principal surface at an angle $\theta_1$ of refraction. As well known in the art, the relationship between the incident angle $\theta_0$ and the angle $\theta_1$ of refraction is given by Snell's law as follows:

$$n\sin\theta_1 = \sin\theta_0,$$

where n represents an index of refraction of the body 46.

The second principal surface has first through fifth outgoing or exit portions through which first through fifth split beams 51a to 51e can be emitted in a manner to be described. The first through the fifth outgoing portions are partially coated with first through fifth semitransparent, namely, translucent layers 52a, 52b, 52c, 52d, and 52e, respectively.

With the beam splitter 45, the incident light beam 22 is transmitted to the first semi-transparent layer 52a through the antireflection layer 48 and the body 46. The light beam is partially transmitted through the first semitransparent layer 52a as the first split beam 51a and is partially internally reflected towards the first principal surface. The internally reflected light beam is reflected by the reflection layer 47 to be sent to the second semitransparent layer 52b. Like the first semitransparent layer 52a, a part of the light beam incident onto the second semitransparent layer 52b is transmitted as the second split beam 51b through the second semitransparent layer 52b and the remaining part is internally reflected towards the reflection layer 47. Similar operation is repeated to produce the third through the fifth split beams 51c to 51e through the third through the fifth semitransparent layers 52c to 52e, respectively. Thus, the first through the fifth split beams 51a to 51e are substantially parallel to one another.

It is preferable that the first through the fifth split beams 51a to 51e have luminous energy substantially equal to one another. To this end, reflectivities of the first through the fifth semitransparent layers 52a to 52e are selected so that the first through the fifth split beams 51a to 51e become equal in intensity to one another.

More specifically, let the reflectivities of the first through the fifth semitransparent layers 52a to 52e be represented by $R_1, R_2, \ldots,$ and $R_5$, respectively, on condition that the reflectivity of the reflection layer 47 and internal absorption of the body 46 are equal to 1 and 0, respectively. In addition, it is assumed that the reflectivity of the antireflection layer 48 be equal to zero. The relationships between the reflectivities $R_1$ to $R_5$ should be given by:

$$\left. \begin{aligned}
(1 - R_1) &= (1 - R_2) \cdot R_1 \\
&= (1 - R_3) \cdot R_1 \cdot R_2 \\
&= (1 - R_4) \cdot R_1 \cdot R_2 \cdot R_3 \\
&= (1 - R_5) \cdot R_1 \cdot R_2 \cdot R_3 \cdot R_4
\end{aligned} \right\} \quad (3)$$

Otherwise, the luminous energy is varied at each of the first through the fifth split beams 51a to 51e. It is possible to deposit the first through the fifth semitransparent layers 52a to 52e satisfying Equations (3), by stacking a plurality of dielectric films. For example, alternate superposition of titanium dioxide and silicon dioxide films realizes the first through the fifth semitransparent layers 52a to 52e having the reflectivities shown by Equations (3). Similarly, the reflection layer 47 can be formed by alternatingly depositing titanium dioxide films and silicon dioxide films. A metal layer may be coated as the reflection layer 47 on the reflection portion. The antireflection layer 48 may be a stack of dielectric films formed by magnesium fluoride ($MgF_2$), zirconium dioxide ($ZrO_2$), and the like.

In the illustrated beam splitter 45, a mutual distance or pitch d between two adjacent ones of the first through the fifth split beams 51a to 51e is given by:

$$d = (2b/n) \cdot \sin\theta_0, \quad (4)$$

where b represents the thickness of the body 46. Therefore, Equation (4) should be considered so as to give the first through the fifth split beams 51a to 51e to the first through the fifth acoustooptic medium blocks 26a to 26e, respectively.

Alternatively, the reflection layer 47 may be deposited on the second principal surface while the semitransparent layers 52a to 52e, the first principal surface.

Turning back to FIG. 4, the first through the fifth split beams 51a to 51e are incident onto the incident surfaces of the first through the fifth acoustooptic medium blocks 26a to 26e, respectively. The first through the fifth transducers 27a to 27e are individually activated by the first through the fifth carrier waves to propagate acoustooptic waves through the first through the fifth acoustooptic medium blocks 26a to 26e, respectively. The acoustooptic waves have frequencies determined by the frequencies of the first through the fifth carrier waves.

Herein, the first through the fifth split beams 51a to 51e are incident onto the incident surfaces of the first through the fifth acoustooptic medium blocks 26a to 26e at the Bragg angles $\theta_B$ relative to wavefronts of the acoustic waves produced by the first through the fifth transducers 27a to 27e, respectively. As a result, the first through the fifth split beams 51a to 51e interact with the acoustic waves in the first through the fifth acoustooptic medium blocks 26a to 26e so as to be subjected to individual deflection, respectively. The resultant deflected beams are emitted through the outgoing surfaces of the first through the fifth acoustooptic medium blocks 26a to 26e as first through fifth outgoing light beams, respectively.

The first through the fifth outgoing light beams comprise zeroth-order light beams 35a to 35e and first-order diffracted light beams 36a to 36e, although only the zeroth-order light beam 35a and the first-order diffracted light beam 36a are illustrated in FIG. 4. When each of the first through the fifth carrier waves is continuously varied within each frequency bandwidth of 25 MHz, each of the first-order diffracted light beams can be deflected within a deflection angle between $\alpha_{1a}$ and $\alpha_{2a}$, as exemplified in connection with the first outgoing light beam in FIG. 4. In the example being illustrated, each deflection angle is equal to 4.36 mrad (0.25°). The zeroth-order light beams are cut by the use of a shield plate (not shown) because they are useless.

In the above-description, the first through the fifth split beams 51a to 51e are assumed to have luminous energy or intensity substantially equal to one another. However, the first-order diffracted light beams can be rendered equal in intensity to one another by controlling the first through the fifth carrier waves even when the first through the fifth split beams 51a to 51e have intensities somewhat different from one another.

Figure 6:
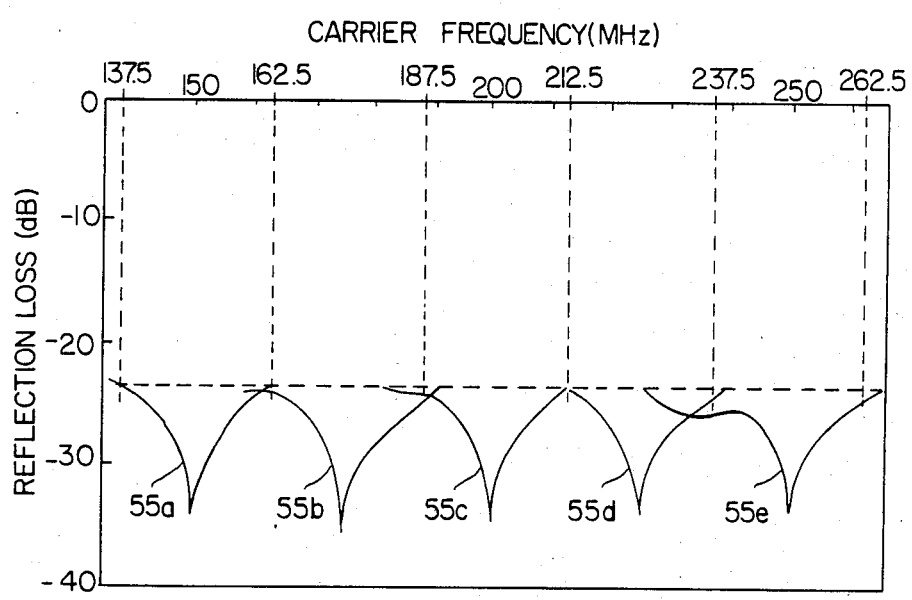
FIG. 6 shows a graphical representation for use in describing a characteristic of the acoustooptic deflection device illustrated in FIG. 4.

Referring to FIG. 6, curves 55a through 55e show carrier frequency to reflection loss characteristics of the first through the fifth partial deflectors illustrated in FIG. 4, respectively. As readily understood from the curve 55a, the reflection loss is not higher than $-23$ dB within the first frequency band between 137.5 and 162.5 MHz. Likewise, the reflection losses never exceed $-23$ dB in all of the second through the fifth frequency bands. Thus, it is possible for the illustrated acoustooptic deflection device to favorably avoid the mismatching of an input impedance of each transducer by dividing a wide frequency band into a plurality of narrow frequency bands in which the reflection loss does not exceed $-23$ dB. To this end, the thickness of each transducer must be selected with reference to each carrier frequency as previously explained.

Figure 7:
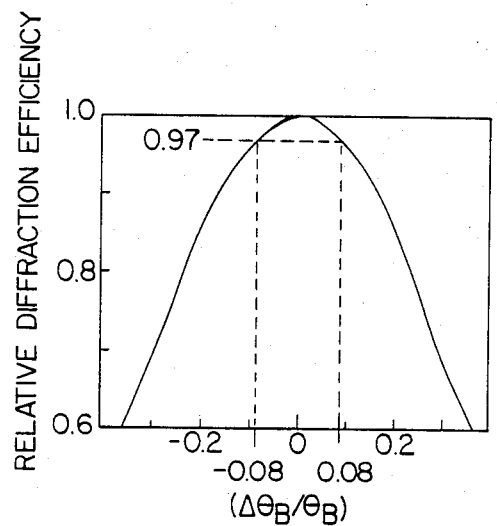
FIG. 7 shows a graphical representation for use in describing another characteristic of the acoustooptic deflection device illustrated in FIG. 4.

Referring to FIG. 7, wherein the abscissa and the ordinate represent the factor ($\Delta\theta_B/\theta_B$) and the relative diffraction efficiency both of which are described in conjunction with FIG. 3, respectively, the first partial deflector takes a maximum one of the factors ($\Delta\theta_B/\theta_B$) while the fifth partial deflector, a minimum one of the factors ($\Delta\theta_B/\theta_B$). The maximum and the minimum factors are equal to $\pm 0.08$ and $\pm 0.05$, respectively. The relative diffraction efficiency is reduced by only a few percents even in the first partial deflector having the maximum factor, as exemplified in FIG. 7. Each of the remaining partial deflectors has a relative diffraction efficiency higher than 97%. The acoustooptic deflection device has an improved relative diffraction efficiency.

Referring to FIG. 4 again and to FIG. 8 afresh, a semicylindrical lens 60 is disposed in front of the respective outgoing surfaces of the first through the fifth acoustooptic medium blocks 26a to 26e with a spacing of 200 mm left between the exit surfaces and the semicylindrical lens 60. As shown in FIG. 4, the semicylindrical lens 60 has a pair of semicircular end surfaces and planar and curved surfaces between the semicircular end surfaces. Each semicircular end surface defines curvature of the semicylindrical lens and may therefore be called a curvature surface. In FIG. 4, the planar surface is directed towards the respective acoustooptic medium blocks 26a to 26e and the curved surface is directed away from the medium blocks 26a to 26e. Thus, the planar and the curved surfaces serve as entrance and exit surfaces, respectively. This means that each curvature surface is kept parallel to the horizontal surface in the example illustrated in FIG. 4.

As illustrated in FIG. 8(a), the first through the fifth outgoing light beams, namely, the first-order diffracted light beams 36a to 36e are projected onto the entrance surface of the semicylindrical lens 60 with the mutual spacing d left therebetween. Each of the first through the fifth outgoing light beams 36a to 36e can be deflected or scanned within a length m which will be termed a scan length and is lengthwise somewhat displaced from one another. In the example being illustrated, the mutual spacing d and the scan length m are equal to 3 mm and 0.872 mm, respectively.

The semicylindrical lens 60 converges the first through the fifth outgoing light beams 36a to 36e to form images at a focal point of the semicylindrical lens 60. As illustrated in FIG. 8(b), the images resulting from the first through the fifth outgoing light beams 36a to 36e are aligned with one another to form a straight line 61. The illustrated straight line 61 has a length M of, for example, 4.36 mm. In other words, the acoustooptic deflection device is capable of equivalently deflecting the incident light beam 22 of the optical source 21 over the length M of 4.36 mm in response to the first through the fifth carrier waves between 137.5 and 262.5 MHz.

As a result, the incident light beam is widely deflected with the illustrated acoustooptic deflection device.

In the acoustooptic deflection device comprising the lens system, such as 60, the length M of the straight line 61 can be varied by changing the spacing between the outgoing surfaces of the respective acoustooptic medium blocks 26a to 26e and the entrance surface of the lens 60. For example, the length M of the straight line 61 becomes equal to 10.9 mm when the spacing is 500 mm.

Referring to FIGS. 9(a) and 9(b), an acoustooptic medium block 26 (suffix omitted) is used as each partial deflector and has an oblique bottom surface 63. In FIG. 9(a), the oblique bottom surface 63 intersects the side surfaces of the block 26 at an acute angle and an obtuse angle, respectively. On the other hand, the oblique bottom surface 63 in FIG. 9(b) intersects the incident and the outgoing surfaces at acute and obtuse angles, respectively. At any rate, each acoustooptic medium block illustrated in FIGS. 9(a) and 9(b) can avoid occurrence of a standing wave resulting from reflection of the acoustic wave. In this case, the absorber 34 (FIG. 4) is not always attached to the illustrated medium block 26.

Such a medium block 26 may be of a single crystal of tellurium dioxide or of optical glass, such as FD-6, AOT-5, AOT-44B, or the like manufactured and sold by Hoya Corporation. Thus, it is preferable that the medium block 26 is made of a material having an excellent figure of merit with respect to acoustooptic interaction and low internal absorption for an acoustic wave and for the light beam.

Figure 10:
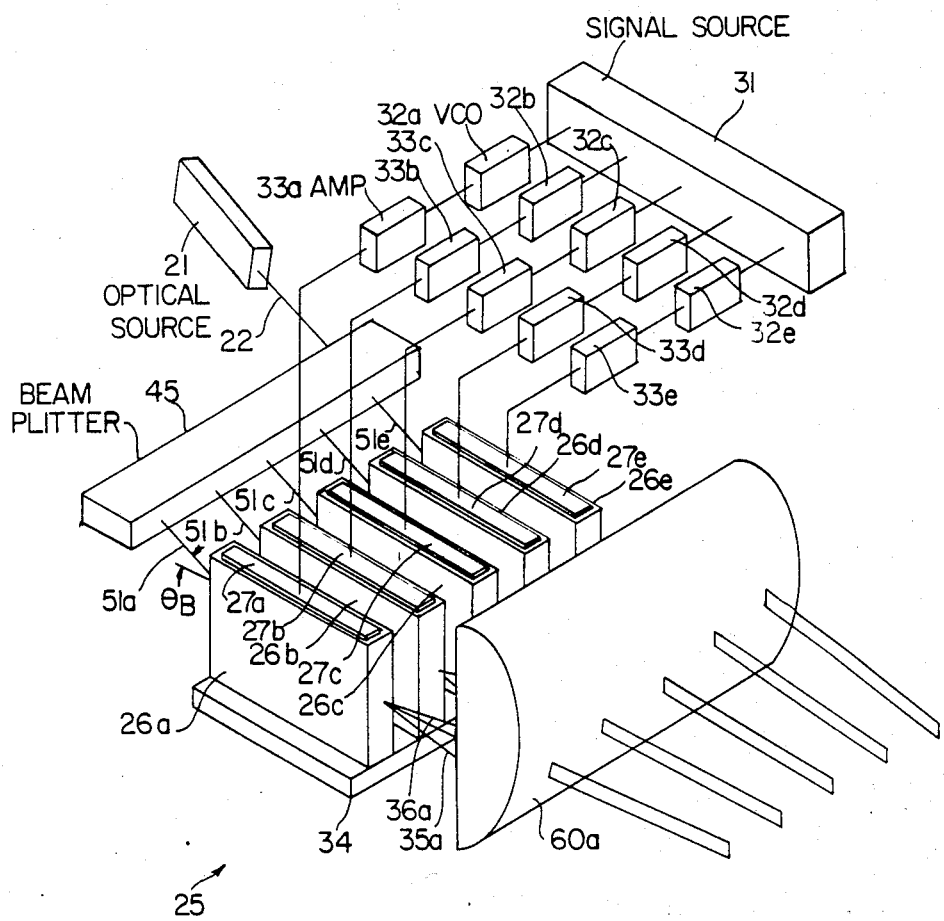
FIG. 10 shows a schematic perspective view of an acoustooptic deflection device according to a second embodiment of this invention.

Referring to FIG. 10, an acoustooptic deflection device according to a second embodiment of this invention is similar to that illustrated in FIG. 4 except that the semicylindrical lens 60a (FIG. 10) has a pair of semicircular end surfaces perpendicular to the horizontal plane along which the absorber 37 is placed. As in FIG. 4, the semicylindrical lens 60a has a planar entrance surface directed towards the first through the fifth partial deflectors and a curved exit surface directed away from the respective partial deflectors.

Referring to FIG. 11 together with FIG. 10, the first through the fifth outgoing light beams 36a to 36e converge at a focal point of the lens 60a to form parallel images 65a to 65e, as shown in FIG. 11. The parallel images 65a to 65e are arranged at an equal distance $d_1$ from one another without any lengthwise displacement illustrated in FIG. 8(a).

With this structure, it is possible to change each length m of the images 65a to 65e by varying the spacing between the outgoing surfaces of the acoustooptic medium blocks 26a to 26e and the entrance surface of the semicylindrical lens 60a. The spacing may be 200 mm, 500 mm, or the like.

In FIGS. 4 and 10, the semicylindrical lens 60 or 60a serves to render the images into a predetermined geometric arrangement and may therefore be replaced by any other optical system for forming such a geometric arrangement. For example, such an optical system may comprise an elliptical lens, a cylindrical lens having a pair of concave surfaces extending in parallel to each other over a predetermined length.

Figure 12:
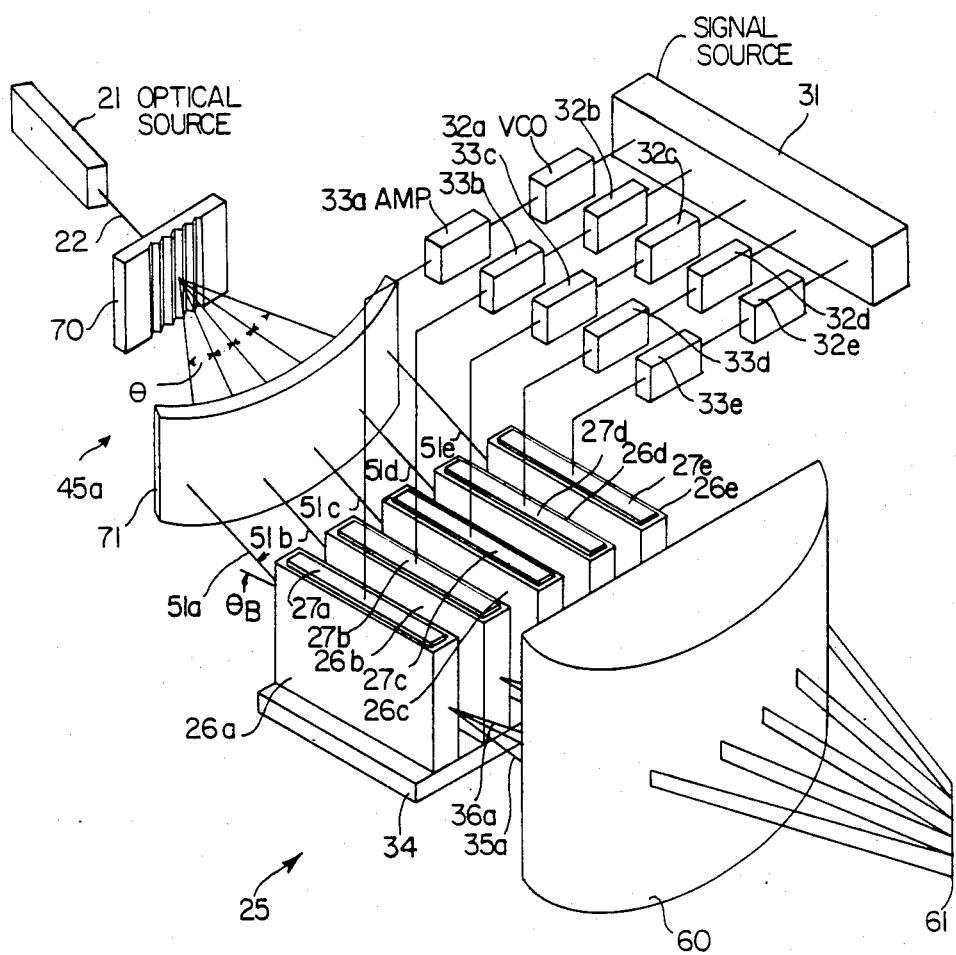
FIG. 12 shows a schematic perspective view of an acoustooptic deflection device according to a third embodiment of this invention.

Referring to FIG. 12, an acoustooptic deflection device according to a third embodiment is similar to that illustrated in FIG. 4 except that the beam splitter 45 comprises a phase diffraction grating 70 of optical glass and a lens system 71. The diffraction grating 70 has slits of 12,000/inch and a lattice constant Dc of 21,000 angstroms. As well known in the art, the incident light beam 21 is diffracted into a plurality of diffracted light beams appearing with maximum intensities at angular positions θ defined by:

$$Dc\sin\theta = p\lambda, \quad (5)$$

where p represents the number of the diffracted light beams and λ, a wavelength of the incident light beam 21. In the example being illustrated, p is equal to five. As a result, the diffraction grating 70 splits the incident light beam 22 into first through fifth diffracted light beams substantially equal in intensity to one another. The first through the fifth diffracted light beams are collimated by the lens system 71 to be delivered to the first through the fifth acoustooptic medium blocks 26a to 26e as the first through the fifth split light beams 51a to 51e, respectively. The illustrated lens system 71 serves to adjust the mutual spacing d to 3 mm and may be an elliptical lens.

The diffraction grating 70 may be either of a transmission type or a reflection type.

Figure 13:
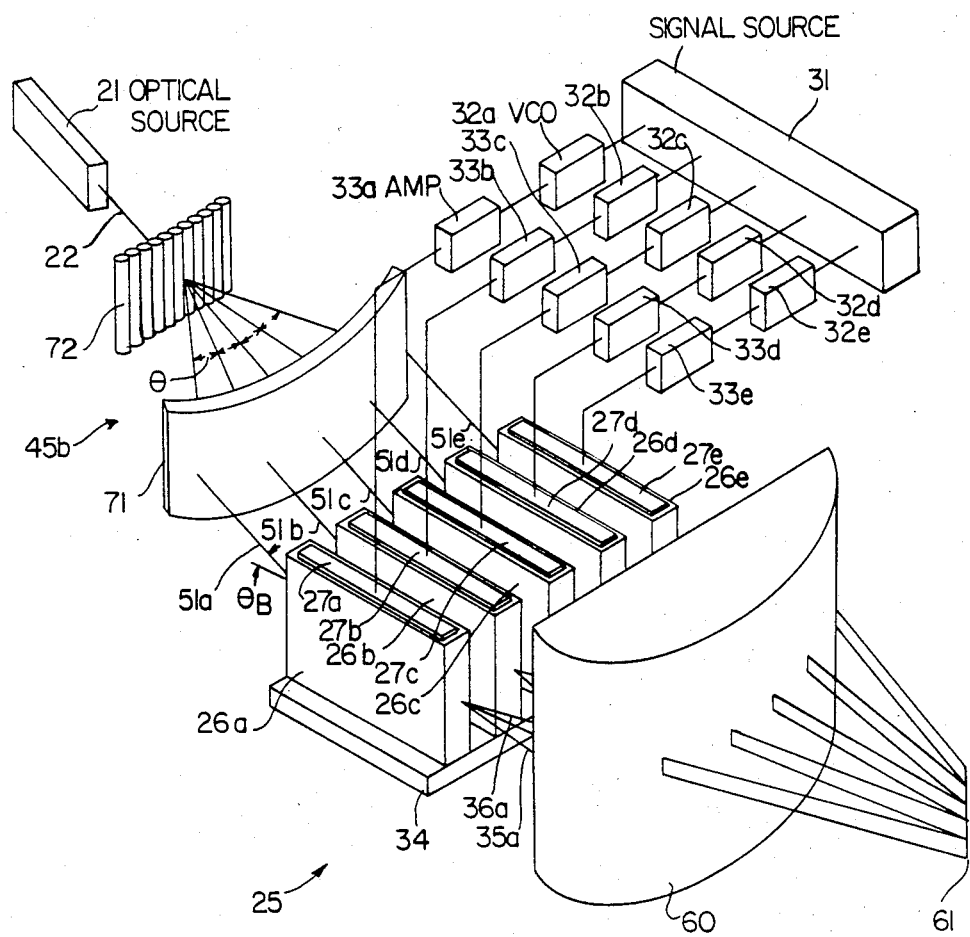
FIG. 13 shows a similar view of an acoustooptic deflection device according to a fourth embodiment of this invention.

Referring to FIG. 13, an acoustooptic deflection device according to a fourth embodiment of this invention is similar to that illustrated in FIG. 12 except that the beam splitter 45b (FIG. 13) comprises a fiber array 72 instead of the diffraction grating 70 (FIG. 12). The fiber array 72 comprises a plurality of optical fibers arranged in parallel with slits left between two adjacent ones of the optical fibers. In the illustrated fiber array, the optical fibers are placed perpendicular to the horizontal plane. The fiber array 72 serves as a grating similar to that illustrated in FIG. 12 and may be a fiber grating. Inasmuch as Equation (5) holds in the fiber grating also, the first through the fifth diffracted light beams are projected from the fiber grating onto the lens system 71 in the manner described in conjunction with FIG. 12. The first through the fifth diffracted light beams are collimated by the lens system 71 as the first through the fifth split light beams 51a to 51e in the manner described in conjunction with FIG. 12.

While this invention has thus far been described in conjunction with several embodiments thereof, it will readily be possible for those skilled in the art to put this invention into practice in various other manners. For example, the number of the split light beams is not limited to five but may be an optional number. The carrier waves may be selected in frequency and bandwidth thereof. Preferably, the highest carrier frequency is less than twice the lowest carrier frequency in view of suppression of spurious components. In FIGS. 4, 10, 12, and 13, an elliptic lens or the like may be substituted for the semicylindrical lens 60 or 60a, so as to arrange the images in line with or parallel to one another. In FIGS. 12 and 13, a semicylindrical lens may be used as the lens system 71 instead of the elliptical lens (FIGS. 12 and 13) and the semicylindrical lens 60 may be placed in the manner illustrated in FIG. 10. Thus, it is possible with the illustrated acoustooptic deflection device to equivalently enlarge the deflection angle ($\alpha_1 - \alpha_2$) and to raise the equivalent resolution of the outgoing light beams. In addition, the luminous energy, namely, the intensity of the outgoing light beams is kept substantially invariable.

What is claimed is:

1. An acoustooptic deflection device responsive to a single incident light beam for producing a predetermined number of outgoing light beams resulting from said indicent light beam, said device comprising beam splitting means for splitting an incident light beam into split light beams equal in number to said predetermined number, signal producing means for producing carrier signals which are equal in number to said predetermined number and which have frequencies falling within frequency bands different from one another, deflecting means equal in number to said predetermined number for individually and acoustooptically deflecting said split light beams in response to said carrier signals to produce deflected light beams as said outgoing light beams, respectively, and an optical lens system for collecting said outgoing light beams at a predetermined position in a predetermined geometric arrangement.

2. An acoustooptic deflection device as claimed in claim 1, wherein said signal producing means comprises:
a voltage source for producing voltages which are equal in number to said predetermined number and which are different from one another; and
signal generating means responsive to said voltages for generating said carrier signals determined by said voltages, respectively.

3. An acoustooptic deflection device as claimed in claim 1, wherein said beam splitting means comprises:
a body having first and second planar surfaces parallel to each other, an incident portion on said first planar surface, an outgoing portion of a preselected one of said first and said second planar surfaces, and a reflection portion on the other of said first and said second planar surfaces:
an antireflection layer coated on said incident portion for receiving said incident light beam;
semitransparent layers coated on said outgoing portion and equal in number to said predetermined number, said semitransparent layers partially allowing said split light beams to pass therethrough and causing reflected light beams to internally occur in said body; and
a reflection layer on said reflection, portion for internally reflecting said internally occuring reflected light beams from said other planar surface back towards said preselected planar surface.

4. An acoustooptic deflection device as claimed in claim 3, wherein said preselected planar surface is said second planar surface.

5. An acoustooptic deflection device as claimed in claim 3, wherein said preselected planar surface is said first planar surface.

6. An acoustooptic deflection device as claimed in claim 1, wherein said beam splitting means comprises:
a diffraction grating responsive to said single incident light beam for emitting diffracted light beams equal in number to said predetermined number; and
a further lens system for rendering said diffracted light beams substantially parallel to one another to produce said split light beams.

7. An acoustooptic deflection device as claimed in claim 1, wherein said beam splitting means comprises:
an optical fiber array for diffracting said single incident light beam into diffracted light beams equal in number to said predetermined number; and
a further lens system for rendering said diffracted light beams substantially parallel to one another.

8. An acoustooptic deflection device as claimed in claim 1, wherein each of said deflecting means comprises:
an acoustooptic medium block of parallelpiped shape having an incident surface for receiving each of said split light beams, an outgoing surface for emitting each of said deflected light beams, and a specific surface intersecting said incident and said outgoing surfaces for receiving each of said carrier signals; and
a transducer having, a thickness predetermined for each said block.

9. An acoustooptic deflection device as claimed in claim 8, wherein the thickness of each of said transducers of said deflecting means is different from one another.

10. An acoustooptic deflection device as claimed in claim 1, wherein said predetermined geometric arrangement is a single straight line.

11. An acoustooptic deflection device as claimed in claim 1, wherein said predetermined geometric arrangement comprises parallel lines equal in number to said predetermined number.

* * * * *